United States Patent Office 3,074,966
Patented Jan. 22, 1963

3,074,966
ALKYLENE OXIDE ADDUCTS OF SUBSTITUTED
TETRAHYDROPYRANS
Robert K. Barnes, Charleston, W. Va., assignor to Union
Carbide Corporation, a corporation of New York
No Drawing. Filed Aug. 10, 1959, Ser. No. 832,469
5 Claims. (Cl. 260—345.9)

This invention relates to new chemical compounds and particularly to alkylene oxide adducts of certain substituted tetrahydropyrans which have useful application as intermediates in the preparation of foams.

The compounds with which the invention is concerned may be exemplified in simplification by the following general formula:

I
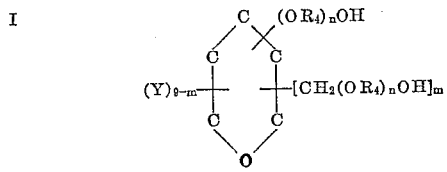

in which Y represents a hydrogen atom or lower alkyl group containing 1 to 6 carbon atoms; $R_4$ is a member of the class of ethylene radicals, propylene radicals or mixtures thereof; $m$ is an integer of 2 to 4; and $n$ is a number having a value of at least one.

The compounds which conform to the structural configuration shown above are obtained by a process which broadly comprises reacting an alkylene oxide with a substituted tetrahydropyran compound selected from the group consisting of 3,3,5,5-tetrakis(hydroxymethyl)-4-hydroxy-tetrahydropyran; 3,3,5 - tris(hydroxymethyl)-5-methyl-4-hydroxy-tetrahydropyran; and 3,5-(hydroxymethyl)-3,5-dimethyl - 4 - hydroxy-tetrahydropyran. The resulting products, identified as hydroxypolyalkyleneoxy ethers of substituted tetrahydropyrans, are characterized by the presence in their molecular structure of hydroxyl-terminated chains of alkylene links, substituted or unsubstituted, which are connected to other alkylene links by means of recurring divalent oxy groups. The alkylene oxide adducts of the invention are useful as solvents, non-ionic detergents, and as valuable intermediates in the preparation of foams. Because of their polyfunctional nature and ring-containing structure the compounds are eminently suited for reaction with diisocyanates in preparation of rigid urethane foams.

The substituted tetrahydropyran starting materials used for reaction with alkylene oxides are derivatives of 4-hydroxy-tetrahydropyrans which contain two to four hydroxymethyl groups, i.e., —CH₂OH, directly attached to carbon atoms that are separated by one carbon atom from the heterocyclic oxygen in the tetrahydropyran ring. The hydroxymethyl groups can be the sole substituents attached to the 4-hydroxy-tetrahydropyran ring, as, for example, 3,3,5,5 - tetrakis(hydroxymethyl) - 4 - hydroxy-tetrahydropyran, or the ring may have attached to it other substituents as characterized by (Y) in Formula I above, e.g., a lower alkyl group containing 1 to 6 carbon atoms. Other monovalent radicals may be substituted in the ring structure provided they do not interfere with reaction between the alkylene oxide and substituted tetrahydropyrans under the reaction conditions employed.

The substituted tetrahydropyrans used as starting materials are well known compounds and have been described in the literature. In general the hydroxymethyl tetrahydropyrans can be prepared by the condensation of formaldehyde with various ketones which possess active hydrogen atoms, such as acetone, methyl ethyl ketone or diethyl ketone, at temperatures between about 50 and 100° C. in the presence of a metal-containing basic catalyst. The products of the reaction after removal of water include a mixture of hydroxy compounds some of which may be recovered as single compounds of definite compositions. In this respect, therefore, the tetrahydropyran starting materials employed for purposes of the invention may be discrete compounds or a mixture of isomers together with a small amount of higher molecular weight condensation products as obtained in the preparation of such compounds.

The alkylene oxide adducts of the invention are obtained by reacting the tetrahydropyran compounds above described with a 1,2-alkylene oxide selected from the group of ethylene oxide, propylene oxide, or mixtures thereof. The reaction is conducted in the presence of a small amount of catalyst by adding the alkylene oxide to the tetrahydropyran material which is preferably stirred and in a molten condition. If desired, the tetrahydropyran can be slurried in an inert solvent, e.g., toluene, xylene, etc., and then reacted with alkylene oxide. The reaction is carried out under atmospheric or superatmospheric pressure at temperatures of about 110 to 170° C. and to the extent required any conventional heat transfer means can be used to remove the exothermic heat of reaction.

The amount of alkylene oxide to be reacted with the tetrahydropyran is determined by the average molecular weight of the product desired. For the adducts described herein which have utility as intermediates in the preparation of foams, the molecular weights, based on the hydroxyl value, can range from about 350 to 10,000 or more. The molecular weight can be in the range of from about 350 to 6000. To obtain such products having the desired molecular weights the tetrahydropyran starting materials are treated with the 1,2-alkylene oxide until each adduct represented in Formula I above by

contains at least one mole of alkylene oxide. Within these limits, of course, the addition of alkylene oxide to each hydroxyl can be balanced or unbalanced, i.e., each may contain approximately the same or different average number of alkylene oxide groups per chain. For high molecular weight products the total moles of alkylene oxide reacted with each hydroxyl group can range from one to about 100 moles, or more.

The time required for completion of the alkylene oxide addition will vary. In general a longer time of alkylene oxide addition is required for products of high molecular weight whereas with a low molecular weight product the reaction is faster and the addition time is short. Additionally, at lower temperatures than those above described, the alkylene oxide addition for high molecular weight products, e.g., 10,000 or more, may require an impractical amount of time such as several weeks. For the products hereinafter prepared, the time required for alkylene oxide addition ranged from about 6 hours to several days.

In carrying out the alkylene oxide reaction any of the known catalysts for this type of addition reaction can be employed. The preferred catalysts are alkaline catalysts, e.g., alkali metal catalysts such as sodium hydroxide, potassium hydroxide, and potassium t-butoxide. The amount of catalyst employed is generally in the range of 0.002 to 2.0 percent by weight, based on the total amount of reactants, including the alkylene oxide or mixtures thereof appearing in the reaction product. An amount of active catalyst within this range is not so large as to cause difficulty in removal of catalyst or introduction of inorganics in the final product and good results have been obtained with about 0.03 to 0.5 percent by weight, based on the total reactants, of potassium t-butoxide. All of the catalyst need not be added at the start of the reaction. If desired, a suitable amount may be initially added and the remainder of the catalyst added from time to time throughout the course of the reaction to maintain a substantially constant catalyst concentration.

The average molecular weight and reactivity of the alkylene oxide adducts prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-tetrahydropyran reaction product and is determined by reacting acetic anhydride (in pyridine solution) at refluxing temperature with the hydroxyl groups of the reaction product. The unreacted anhydride and acetic acid formed are titrated with aqueous sodium hydroxide using phenolphthalein as an indicator. The molecular weight can be readily calculated from the hydroxyl number by using the formula:

II $$M.W. = \frac{Functionality \times 1000 \times 56.1}{Hydroxyl\ No.}$$

The hydroxypolyalkyleneoxy tetrahydropyrans of this invention are particularly useful in the preparation of intermediates for a wide variety of elastomers and polyurethane foams which can be prepared from relatively inexpensive and available starting materials. Polyurethane foams made from the new compounds of the invention by reaction of the terminal hydroxyl groups with polyisocyanates possess good compression properties as compared with foams produced, for example, by isocyanate modification of dicarboxylic acid-triol polyesters.

The advantages and utility of the methods and products of the invention will become further apparent from the following detailed examples included to illustrate the best modes now contemplated for carrying out the invention.

*Example I*

202 grams of anhydrous 3,3,5,5-tetrakis(hydroxymethyl)-4-hydroxy-tetrahydropyran and 15 grams of potassium t butoxide are charged to a reactor and heated to a temperature of about 125–130° C. 457 grams of propylene oxide are added at a rate to maintain a pressure between 30 to 35 p.s.i. in the reactor. When the reaction is complete the residue is diluted with isopropanol, treated with Dowex 50 ion exchange resin and then stripped. The product obtained has an equivalent weight per hydroxyl of 157.1 which corresponds to a Hydroxyl No. of about 357.

*Example II*

206 grams of 3,3,5-tris(hydroxymethyl)-5-methyl-4-hydroxy-tetrahydropyran and 15 grams of potassium t-butoxide are reacted with 7.1 moles of propylene oxide in the same manner as described in Example I. The temperature of the reaction is maintained at about 120° C. under a pressure of 28 to 40 p.s.i. The product obtained has an equivalent weight per hydroxyl of about 162 which corresponds to a Hydroxyl No. of about 347.

*Example III*

190 grams of 3,5-(hydroxymethyl)-3,5-dimethyl-4-hydroxy-tetrahydropyran and 15 grams of potassium t-butoxide are reacted with a mixture of eight moles of propylene oxide and eight moles of ethylene oxide. The reaction is carried out at a temperature of about 130° C. under a pressure of about 28 to 40 p.s.i. The product obtained has an equivalent weight per hydroxyl of about 335 which corresponds to a Hydroxyl No. of about 168.

*Example IV*

One hundred and forty grams of the propylene oxide adduct prepared in Example I was mixed with 0.89 gram of dibutyltin dilaurate, 1.3 grams of a silicone oil surfactant (a siloxane-oxyalkylene copolymer) and 41 grams of trichloromonofluoromethane. 85.5 grams of a mixture of 80% 2,4-20% 2,6-tolylene diisocyanates was then added under intensive agitation. As soon as the foaming reaction began, the mixture was transferred into an open mold.

The foaming was fast and the foam was allowed to cure for 10 minutes at 70° C. After two weeks aging at ambient temperature the foam had the following physical properties:

Density, lbs./ft.$^3$ _____ 1.7
Maixmum compression load, p.s.i., at 5.3% deflection _____ 26
Closed cells, percent_____ 56

What is claimed is:

1. The adducts of alkylene oxide and a 4-hydroxy-tetrahydropyran, said alkylene oxide being selected from the group consisting of ethylene oxide, propylene oxide, and mixture thereof, said 4-hydroxy-tetrahydropyran having the formula:

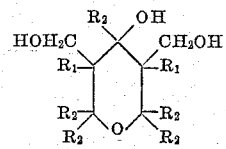

wherein $R_1$ is selected from the group consisting of hydrogen, hydroxymethyl, and alkyl radicals having from 1 to 6 carbon atoms; and wherein $R_2$ is selected from the group of hydrogen and alkyl radicals having from 1 to 6 carbon atoms, said adducts having a molecular weight of from about 350 to 10,000, and said adducts having combined therein from 1 to about 100 moles of said alkylene oxide per hydroxyl equivalent in a mole of said tetrahydropyran.

2. The composition of claim 1 wherein said adduct has a molecular weight in the range of from about 350 to 6000.

3. The adducts of alkylene oxide and 3,3,5,5-tetrakis-(hydroxymethyl)-4-hydroxy-tetrahydropyran, said alkylene oxide selected from the group consisting of ethylene oxide, propylene oxide, and mixtures thereof; said adducts having a molecular weight in the range of from about 350 to 6000, and said adducts having combined therein from 1 to about 100 moles of said alkylene oxide per hydroxyl equivalent in a mole of said tetrahydropyran.

4. The adducts of alkylene oxide and 3,3,5-tris(hydroxymethyl) - 5 - methyl - 4 - hydroxy-tetrahydropyran, said alklene oxide being selected from the group consisting of ethylene oxide, propylene oxide, and mixtures thereof; said adducts having a molecular weight of from about 350 to 6000; and said adducts having combined therein about from 1 to 100 moles of said alkylene oxide per hydroxyl equivalent in a mole of said tetrahydropyran.

5. The adducts of alkylene oxide and 3,5-(hydroxymethyl) - 3,5 - dimethyl - 4 - hydroxy - tetrahydropyran, said alkylene oxide being selected from the group consisting of ethylene oxide, propylene oxide, and mixtures thereof; said adducts having a molecular weight of from about 350 to 6000; and said adducts having combined therein about from 1 to 100 moles of said alkylene oxide per hydroxyl equivalent in a mole of said tetrahydropyran.

No references cited.